United States Patent Office 2,731,431
Patented Jan. 17, 1956

2,731,431

METHYLPOLYCHLORO FATTY ACID ESTERS STABILIZED WITH EPOXIDIZED FATTY OIL AND COMPOSITIONS THEREOF WITH POLYVINYL RESINS

Paul Robitschek, Buffalo, and Dean B. Stormon, Niagara Falls, N. Y., assignors to Hooker Electrochemical Company, Niagara Falls, N. Y., a corporation of New York No Drawing. Application October 6, 1951,
Serial No. 250,188

4 Claims. (Cl. 260—23)

This invention relates to stabilized methyl esters of polychloro fatty acid compositions and to compositions of said stabilized methyl esters of polychloro fatty acids with polymers of vinyl halides, particularly with, polyvinyl chloride and its copolymers with vinylidene chloride and/or vinyl esters, such as vinyl acetate, vinyl benzoate, etc. More particularly, this invention relates to methylchlorostearates containing at least three chlorine atoms and preferably containing an average of about five chlorine atoms per molecule, stabilized with ester-type compounds, either monomeric or polymeric, which are esters of fatty acids containing one or more double bonds and/or one or more epoxide groups, particularly as resulting from epoxidation of unsaturated fatty oils, said esters possessing in addition to their stabilizing action on chlorinated compounds, a plasticizing action on polyvinyl halides; and to compositions of such stabilized methylpolychlorostearate with polymers of vinyl chloride, including its copolymers.

Methylpolychlorostearates having three to six chlorine atoms per molecule are relatively inexpensive materials having known plasticizing action on polyvinyl chloride or copolymers thereof, however, such materials have not found wide utilization in industry primarily because of the instability associated therewith. It is well known that such chlorinated esters have a marked tendency to undergo decomposition on storage, during shipment or on heating, with the effects of such decomposition being evidenced by liberation of hydrogen chloride and discoloration of the material, and by various other undesirable characteristics such as objectionable odor, etc. Methylpentachlorostearate is a light straw colored liquid which, when exposed to high temperature such as between 100 and 175 degrees centigrade, discolors in a matter of a few hours to a black liquid. Methylpentachlorostearate will also discolor to a similarly undesirable black colored product during storage or transportation over a prolonged period of time involving several months. In addition, it has been found impossible to incorporate unstabilized methylpentachlorostearate into polymers of vinyl chloride at the time of milling on hot rolls without accompanying obnoxious effects such as hydrogen chloride evolution, darkening of the products, etc. These undesirable characteristics of methylpentachlorostearate have prevented its widespread utilization as a plasticizer for polyvinyl chloride or copolymers thereof, since the ordinary temperature conditions of processing and compounding polyvinyl chloride cause the decomposition of unstabilized methylpentachlorostearate with all the attendant disadvantages and also because the product has been found to decompose during transportation and/or storage prior to use.

It has been proposed heretofore to effect the stabilization of polyvinyl chloride compositions employing methylpolychlorostearates containing at least three chlorine atoms per molecule as plasticizer by incorporating therein a small proportion of a lead compound such as lead oxide, lead salts, such as lead acetate, lead silicate, lead stearate, lead salt of para tertiary amyl phenol, etc., however, the use of lead stabilizers has not enabled the use of such compositions of methylpolychlorostearates as plasticizers for polyvinyl chloride or copolymers thereof for uses other than in the electrical wire coating field, where discoloration is an unimportant factor which may be disregarded in favor of electrical properties. The lead-type stabilizers suggested heretofore are very slight soluble or insoluble in methylpolychlorostearates and consequently, they settle out on standing; they also deleteriously alter the transparency of polyvinyl resins plasticized therewith. Moreover, in order to be used effectively in the electrical stabilization of methylpentachlorostearate, the lead stabilizers must be added to, and thoroughly dispersed in, the polyvinyl resin compositions, in amounts in excess of their solubility, at the time the polyvinyl resin is being compounded into its final form, i. e., during milling. These lead stabilizers are ineffective in maintaining the methylpolychlorostearate stable during storage or shipment, prior to use in the milling operation of the polyvinyl resin. Because of these factors, the field of use for methylpolychlorostearates has been seriously limited to use in only the electrical wire coating field where rigid color specifications are not required.

It is therefore an object of this invention to provide compositions of methylpolychlorostearates, particularly methylpentachlorostearate, which are stable during storage or shipment of said compositions, and which are compatible with, and are plasticizers for, polymers of vinyl chlorides; said compositions being stable during processing of the polyvinyl resin formulations, such as during milling under elevated temperatures, without appreciable loss of stabilizer or plasticizer to produce compositions of polyvinyl resins which are plasticized and stabilized to the desired extent and which possess good color and other valuable properties.

These and related objects are accomplished in accordance with this invention by effecting the stabilization of methylpolychlorostearate with ester-type compounds in monomeric or polymeric form which are esters of fatty acids containing one or more double bonds and/or one or more epoxide groups, particularly as resulting from the epoxidation of unsaturated fatty oils, to produce a stabilized composition and employing said stabilized composition as plasticizer for polymers of vinyl halides to produce polyvinyl resinous compositions possessing the valuable properties disclosed herein. Among the specific materials which have been found useful in accordance with this invention is a material sold by the Rohm & Haas Company of Philadelphia, Pennsylvania, under the trademark Paraplex G-60. The following are identifying physical properties of Paraplex G-60: it is a clear, oily, light-amber-colored, thick liquid having a slightly oily odor and having a viscosity at 25 degrees centigrade of 200 to 300 centipoises; it has a solidification temperature of 0 degrees centigrade, a flash point of 310 degrees centigrade and a fire point of 340 degrees centigrade; its specific gravity at 25 degrees centigrade is 0.9898, its refractive index at 25 degrees centigrade is 1.4719; and it has an acid number of 1.0 mgm. KOH per gram. Also included in the definition of the useful materials in accordance with this invention are the following: methyl 9,10-epoxystearate; methyl 9,10-epoxy-12-hydroxy stearate; and other products obtained by epoxidation of oils such as soybean oil, linseed oil, etc.; and as described by Findley et al. in 67 JACS 413 March 1945; and in United States Patents 2,458,484 and 2,567,930, and 2,569,502 and 2,485,160.

The methylpolychlorostearate compositions stabilized in accordance with this invention are valuable materials as chemical intermediates and are particularly useful as plasticizers for polymers of vinyl chloride compositions, because they are inexpensive materials which impart into the polyvinyl resin compositions certain desirable properties such as flame retardance; high permanence, such as low volatility, low extraction by oils and water, and low migration; in addition to having good flexing properties, while still maintaining a high standard of mechanical and other properties, generally sought in polyvinyl resin compositions.

In the following examples given in Table I, which illustrate a feature of this invention and which are not to be construed as limiting, the compositions tested were made by simply mixing the ingredients in the weight proportion indicated. The test procedures employed were as follows: Heat stability color test—samples of the material to be tested were color analyzed on a TAG ASTM Union Colorimeter before and after being submitted to an accelerated heat aging test. The heat aging test consisted of maintaining a sample of the material to be tested at a temperature of 100 degrees centigrade in an air circulation oven for a period of sixteen hours. Hydrogen chloride decomposition test—an accelerated thermal stability test is employed for determining hydrogen chloride decomposition in chlorinated organic compounds which is commonly referred to in the industry as the 6–300 $N_2$ test. It includes weighing a 20 gram sample of the material under test into an all glass evolution equipment which is maintained at $300\pm0.5$ degrees Fahrenheit by use of an oil bath. Pre-dried nitrogen is aspirated through the sample for six hours at a rate of seventeen liters per hour. The gaseous stream is passed into a Corson absorption bottle containing sodium hydroxide solution. Chlorides are determined in the absorption solution by titration employing silver nitrate using a specialized modification of the Caldwell Volhard technique. In this test the HCl evolution is calculated and reported on a percentage basis.

TABLE I

*Stabilization of methylpolychlorostearates*

| Composition | Color Test | | HCl Decomposition Test, Percent HCl |
|---|---|---|---|
| | Original | After Test | |
| Methylpentachlorostearate (MPS) | 1– | 4 | 0.43 |
| MPS+1% Paraplex G-60 (PG-60) | 1– | 2½ | |
| MPS+5% PG-60 | 1– | 1½ | 0.04 |

From a consideration of Table I, it can be readily seen that the compositions included in this invention are markedly stabilized against color decomposition and development of acidity on exposure to extreme temperature conditions. Samples of unstabilized methylpentachlorostearate stored in ordinary steel drums of commerce start to decompose after about four weeks of storage under conditions of ordinary summer heat, whereas compositions of this invention containing five per cent stabilizer remain their natural faint straw color after one year of storage under the same conditions. Compositions of this invention containing five per cent stabilizer, stored in ordinary glass bottles under normal laboratory conditions, last more than one year without decomposition, either in discoloring or in development of acidity, whereas unstabilized methylpentachlorostearate stored in ordinary glass bottles in the laboratory start to decompose in about two months.

The stabilized methylpolychlorostearate compositions of this invention when employed as plasticizers for polyvinyl resins are blended by any conventional method such as by thorough mixing with the vinyl resin on a rolling mill which is heated to the temperature of about 300 degrees Fahrenheit. After a band of film is formed the sheet is worked on the mill for a period of five minutes with frequent cutting. The stabilized methylpolychlorostearates are used in the proportion necessary to achieve the desired properties in the final polyvinyl composition and although the proportions necessary to obtain these desired properties will vary with the number of chlorine atoms in each molecule of the methylpolychlorostearate, and with the proportion of stabilizer included therein, it is generally found that from about 30 to 80 parts by weight per 100 parts of polyvinyl chloride is satisfactory when the stabilized methylpolychlorostearate contains about five chlorine atoms and is the sole plasticizer. The stabilized methylpolychlorostearates may be used as the only plasticizing component in the compounded polyvinyl chloride; however, they may be advantageously used in conjunction with other plasticizers in order to achieve a wide variety of desirable properties in the finally compounded resin as will be shown hereinafter.

The following test procedures were employed in accumulating the data given in the tables which follow showing the properties of polyvinyl chloride resins plasticized with methylpentachlorostearate, stabilized in accordance with this invention. Hardness is determined on a Shore Durometer, Scale A, in accordance with ASTM–49T. Stiffness is determined by use of a Table V–5 stiffness gauge manufactured by the Taber Instrument Company, North Tonawanda, New York. Stress-strain properties are determined on the samples before and after aging on a Scott tensile tester, Model L-6, run at a speed of two inches per minute. Test samples in the shape of a dumbbell were made in accordance with ASTM procedures. Low temperature flexibility is determined by a modification of the torsional modulus test of Clash and Berg, I. & E. Chem., v. 34, p. 1218 (1942). In the modification, the liquid bath is replaced by a cold air chamber. Water aging is determined by immersing the samples in water at 212 degrees Fahrenheit for twenty-four hours, wiping them dry to obtain the "wet weight," then drying them in an air circulation oven at 212 degrees Fahrenheit for twenty-four hours to obtain the "weight after heating" and then analyzing their stress-strain properties; from these data the per cent water absorbed and per cent water solubles are calculated. Gasoline and oil aging are determined in the same manner outlined for water aging except that the samples were immersed in gasoline or mineral oil for ten days at room temperature. Flame retardance is evaluated by the Kent and Weaver flammability test (see India Rubber World, v. 115, p. 813, March 1947). Heat aging including any loss in flexibility due to decomposition is estimated by a test comprising aging the sample at a temperature of 212 degrees Fahrenheit for a period of one week in a circulating air oven, determining the stress-strain properties before and after aging and also determining the amount of plasticizer lost by weighing the samples before and after aging and expressing this as a percentage of the plasticizer originally present in the composition. The effects of heat on discoloration and transparency are evaluated by aging samples forty mills in thickness in a circulating air oven at a temperature of 140 degrees centigrade for different periods of time. Light discoloration tests are carried out according to ASTM Method D620–49 wherein samples of material forty mills in thickness are rotated at 33 R. P. M. at a distance of seven inches from a General Electric Company sun lamp. The results of both the heat and light aging discoloration tests are evaluated by comparing the colors developed during the test period by employing the Hazen Color Scale (see Am. Chem. Jour., v. 12, p. 427, 1892).

The data in the following tables were determined in accordance with the foregoing procedures on samples of material prepared by milling 100 parts of commercial polyvinyl chloride (Geon 101, manufactured by the B. F. Goodrich Co.) with the indicated weight proportions of methylpentachlorostearate which had been stabilized with the given per cent by weight of Paraplex G–60.

TABLE II
*Properties of polyvinyl chloride plasticized with methylpentachlorostearate containing five percent Paraplex G-60*

| Parts by Wt. of Plasticizer With PVC | Shore A Hardness | Taber Stiffness | 100% Modulus in p. s. i. | Tensile Strength in p. s. i. | Elongation at Break in Percent | Low Temp. Flexibility in ° C. | Solubles in Percent in— Water | Oil | Gasoline | Flame Retardance Out Time in Seconds |
|---|---|---|---|---|---|---|---|---|---|---|
| 30 | 100 | 2,000 | 3,900 | 4,300 | 105 | | | | | |
| 40 | 98 | 940 | 2,700 | 3,800 | 150 | | | | | |
| 50 | 95 | 140 | 2,200 | 3,500 | 210 | −2.5 | 0.7 | 0.09 | 2.0 | 0 |
| 60 | 92 | 99 | 1,950 | 3,150 | 255 | | | | | |
| 65 | 85 | 44 | 1,650 | 2,900 | 280 | | | | | |
| 70 | 84 | 38 | 1,200 | 2,650 | 295 | −12.5 | 0.9 | | 4.0 | 0 |
| 80 | 75 | 23 | 900 | 2,200 | 320 | | | | | |

TABLE III
*Effects on mechanical properties of heat aging for one week at 212° F. PVC plasticized with methylpentachlorostearate containing five percent Paraplex G-60*

| Parts by Wt. of Plasticizer With PVC | 100% Modulus in p. s. i. | | Tensile Strength in p. s. i. | | Percent Elongation at Break | | Percent Plasticizer Lost |
|---|---|---|---|---|---|---|---|
| | Unaged | Aged | Unaged | Aged | Unaged | Aged | |
| 50 | 2,200 | 2,400 | 3,500 | 3,700 | 210 | 195 | 8.3 |
| 65 | 1,650 | 1,800 | 2,870 | 3,050 | 280 | 265 | 7.2 |

TABLE V
*Effects on color of light aging for five days under G. E. sun lamp PVC plasticized with methylpentachlorostearate unstabilized and containing five and ten percent Paraplex G-60*

| Composition | Light Aging Time, 5 Days |
|---|---|
| 100 parts of Geon 101, 50 parts of MPS (unstabilized) | 30 |
| 100 parts of Geon 101, 50 parts of MPS containing 5 parts of Paraplex G-60 | 20 |
| 100 parts of Geon 101, 50 parts of MPS containing 10 parts of Paraplex G-60 | 10 |

TABLE VI
*Properties of mixtures of MPS containing five per cent PG-60 and dioctyl phthalate*

| | Parts by Weight of Mixtures Tested | | | | | |
|---|---|---|---|---|---|---|
| Components: | | | | | | |
| Geon 101 | 100 | 100 | 100 | 100 | 100 | 100 |
| Dioctyl Phthalate | 50 | 40 | 30 | 20 | 10 | 0 |
| MPS Containing 5% PG-60 | 0 | 13 | 26 | 39 | 52 | 65 |
| Mechanical Properties: | | | | | | |
| Hardness | 86 | 88 | 89 | 89 | 87 | 85 |
| Taber Stiffness | 54 | 48 | 45 | 47 | 43 | 44 |
| 100% Modulus | 1,570 | 1,540 | 1,510 | 1,670 | 1,740 | 1,770 |
| Ultimate Tensile Strength, p. s. i. | 2,670 | 2,700 | 2,710 | 2,855 | 2,925 | 2,880 |
| Elongation, Percent | 220 | 245 | 275 | 270 | 275 | 285 |
| Low Temp. Flexibility, ° C | −22.0 | −16.0 | −15.0 | −14.0 | −13.0 | −12.5 |
| | 100 cy. | 100 cy. | 100 cy. | 100 cy. | 100 cy. | 100 cy. |
| Electrical Properties: | | | | | | |
| Dielectric Constant | 6.6 | 7.9 | 8.0 | 8.2 | 7.8 | 7.6 |
| Power Factor | .021 | .024 | .026 | .027 | .028 | .021 |
| Loss Factor | .138 | .190 | .208 | .221 | .218 | .160 |
| Vol. Resistivity, ohm/cm. at 25° C | $2.3 \times 10^{12}$ | $2.6 \times 10^{12}$ | $19.0 \times 10^{12}$ | $30 \times 10^{12}$ | $14.6 \times 10^{12}$ | $12.6 \times 10^{12}$ |
| Diel. Strength, Volts per mil | 650 | 445 | 455 | 532 | 565 | 782 |
| Heat Aging: 1 Week at 212° F.: | | | | | | |
| 100% Modulus | 2,470 | 2,280 | 2,020 | 1,850 | 1,840 | 1,800 |
| Ultimate Tensile Strength, p. s. i. | 2,960 | 2,930 | 2,890 | 2,900 | 2,900 | 3,050 |
| Elongation at Break, Percent | 180 | 230 | 240 | 240 | 260 | 280 |
| Plasticizer Loss on Aging: | | | | | | |
| 1 Week at 212° F. in Air | 38.8 | 27.2 | 20.1 | 14.8 | 10.2 | 7.2 |
| 24 Hours at 212° F. in Water | 4.3 | 3.1 | 3.1 | 3.0 | 2.8 | 2.3 |
| 10 Days at 23° C. in 100 Octane Gas | 52.1 | 46.2 | 31.7 | 19.9 | 14.7 | 10.3 |
| Flammability: Flame-out Time, Seconds | 67.0 | 37.8 | 25.2 | 9.5 | 4.2 | 0 |

TABLE IV
*Effects on color of heat aging at 140° C. PVC plasticized with methylpentachlorostearate unstabilized and containing five and ten percent Paraplex G-60*

| Composition | Unaged | Heat Aging Time | | |
|---|---|---|---|---|
| | | ½ Hour | 1 Hour | 2 Hours |
| 100 parts of Geon 101, 50 parts of MPS (unstabilized) | 20 | 30 | 70 | 90 |
| 100 parts of Geon 101, 50 parts of MPS containing 5 parts of Paraplex G-60 | 5 | 10 | 10 | 30 |
| 100 parts of Geon 101, 50 parts of MPS containing 10 parts of Paraplex G-60 | 5 | 5 | 10 | 20 |

From a consideration of the data in the foregoing tables, it will be noted that Table II shows the effects of increasing quantities of the stabilized plasticizer of this invention on the various mechanical properties of polyvinyl chloride plasticized therewith. If methylpentachlorostearate containing five per cent Paraplex G-60 was the sole plasticizer for the polyvinyl chloride composition, the optimum quantity for most uses would be between about 50 and 70 parts by weight of plasticizer per 100 parts of polyvinyl chloride resin. Table II also shows the superiority of polyvinyl chloride compositions plasticized with methylpentachlorostearate containing five per cent Paraplex G-60 with respect to strength in tension, flame-proofing qualities, and insolubility in water, oil and gasoline. It should also be noted that the compositions retain high tensile strength in formulations having high elongations. Table III shows the superior properties of polyvinyl chloride compositions of this invention with respect to low volatility, as borne out by the low plasticizer loss and small increase in stiffness, as indicated by the modulus and tensile strength data, together with only a slight decrease in elongation before break. Table IV shows the marked difference in discoloration between compositions of polyvinyl chloride with methylpentachlorostearate unstabilized, and stabilized in accordance with this invention. It should be pointed out that when compounding the formulation containing 100 parts of Geon 101 and 50 parts of unstabilized methylpentachlorostearate, there was profuse liberation of hydrogen chloride and objectionable odors at the time of milling at a temperature of about 300 degrees Fahrenheit, in addition to the development of darkened color, as indicated by the values given in Hazen color units. Table V shows the effects of light aging on discoloration between unstabilized and the stabilized compositions of this invention with our compositions being more stable as indicated by the Hazen color values given. Table VI shows that valuable compositions of polyvinyl chloride containing methylpentachlorostearate which has been stabilized with Paraplex G-60 may be prepared by including other plasticizers therein. In addition, Table VI offers a comparison between polyvinyl chloride plasticized with only dioctyl phthalate and polyvinyl chloride plasticized with only methylpentachlorostearate containing five per cent Paraplex G-60, and that in many respects the compositions of this invention are superior.

In the foregoing tables, specific embodiments of this invention have been illustrated in detail. However, it is to be understood that this invention is not to be limited thereby since equally effective results are obtained when employing copolymers of vinyl chloride with vinyl acetate and with vinylidene chloride.

It should be particularly pointed out that the methylpolychlorostearates used in this invention were made by chlorinating methyl stearate which was made by esterifying a commercial stearic acid which consisted of a mixture of components comprising large proportions of stearic acid and palmitic acids and including some oleic, linoleic, myristic, dodecanoic, etc.; and that the chlorinated alkyl esters of any of these acids, as mixtures or as pure components are equally suited for the purpose of this invention. Moreover, a mixture of oleic and linoleic acids or other similar commercial mixtures may be substituted for the stearates; therefore, the term fatty acids employed herein includes saturated and unsaturated fatty acids containing predominantly 16 to 18 carbon atoms; and "stearate" as used herein includes stearates and palmitates and other acid components found in commercial stearic acid.

It is also to be understood that among the materials useful as stabilizers in accordance with this invention are the partially epoxidized unsaturated fatty oils containing both olefinic and epoxide linkages in the molecule, in various percentages or fractions; partially epoxidized linseed, soybean and castor oils being particularly suitable. The term unsaturated fatty oil as used herein includes in addition to the already mentioned fatty oils, corn oil, cotton seed oil, peanut oil and the like.

Different proportions of these various materials will necessarily be required in order to obtain the optimum results for the desired application of the materials involved herein. In order to effectively stabilize a methylpolychlorostearate effectively against darkening in color and development of acidity while in storage or transit about one per cent by weight of stabilizer should be incorporated therein; however, this will depend upon all the conditions of storage such as temperature, contact with metals, time, etc.; five per cent by weight of stabilizer mixed in a methylpolychlorostearate has been found particularly effective and larger percentages are advantageously used therein when the stabilized material is to be used as a plasticizer because the stabilizer and any excess of it also effectively acts as a plasticizer for polyvinyl chloride. The optimum proportions to be used in each case are readily determined in a manner after the foregoing specification.

We claim:

1. A composition comprising: a polymer of vinyl chloride; a methylpolychlorostearate having between about three and six chlorine atoms per molecule; and as a stabilizer therefor, an epoxidized unsaturated fatty oil containing at least one epoxide linkage in the acid portion of the fatty oil which is effective in stabilization of chlorine containing organic compounds.

2. A composition comprising: a polymer of vinyl chloride; a methylpolychlorostearate having between about three and six chlorine atoms per molecule; and as a stabilizer therefor, a partially epoxidized unsaturated fatty oil containing at least one epoxide linkage in the acid portion of fatty oil which is effective in stabilization of chlorine containing organic compounds.

3. A new composition of matter comprising: a methylpolychlorostearate having between about 3 and 6 chlorine atoms per molecule stabilized against color decomposition and development of acidity by having added thereto an epoxidized unsaturated fatty oil containing at least one epoxide linkage in the acid portion of the fatty oil which is effective in stabilization of chlorine containing organic compounds.

4. A new composition of matter comprising: methylpentachlorostearate stabilized against color decomposition and development of acidity by having added thereto a partially epoxidized unsaturated fatty oil containing at least one epoxide linkage in the acid portion of the fatty oil which is effective in stabilization of chlorine containing organic compounds.

References Cited in the file of this patent

UNITED STATES PATENTS

| Number | Name | Date |
|---|---|---|
| 2,369,985 | Safford | Feb. 20, 1945 |
| 2,485,160 | Niederhauser | Oct. 18, 1949 |
| 2,556,145 | Niederhauser | June 5, 1951 |
| 2,559,177 | Terry | July 3, 1951 |